March 1, 1949. A. B. SEPPMANN 2,463,062
COMPOUND MASTER CYLINDER FOR HYDRAULIC BRAKE SYSTEMS
Filed Feb. 20, 1947 3 Sheets-Sheet 1

INVENTOR
ALFRED B. SEPPMANN
by Bair & Freeman
ATTORNEYS

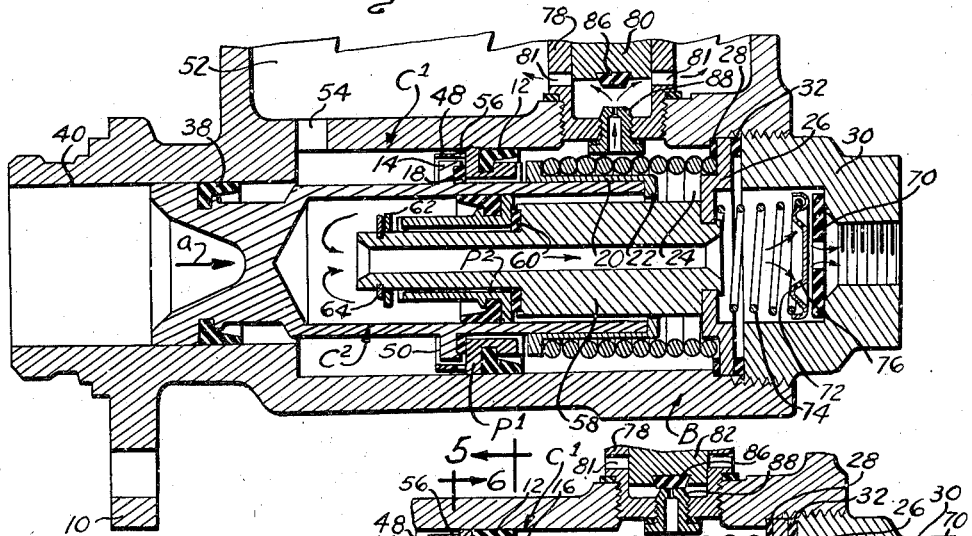

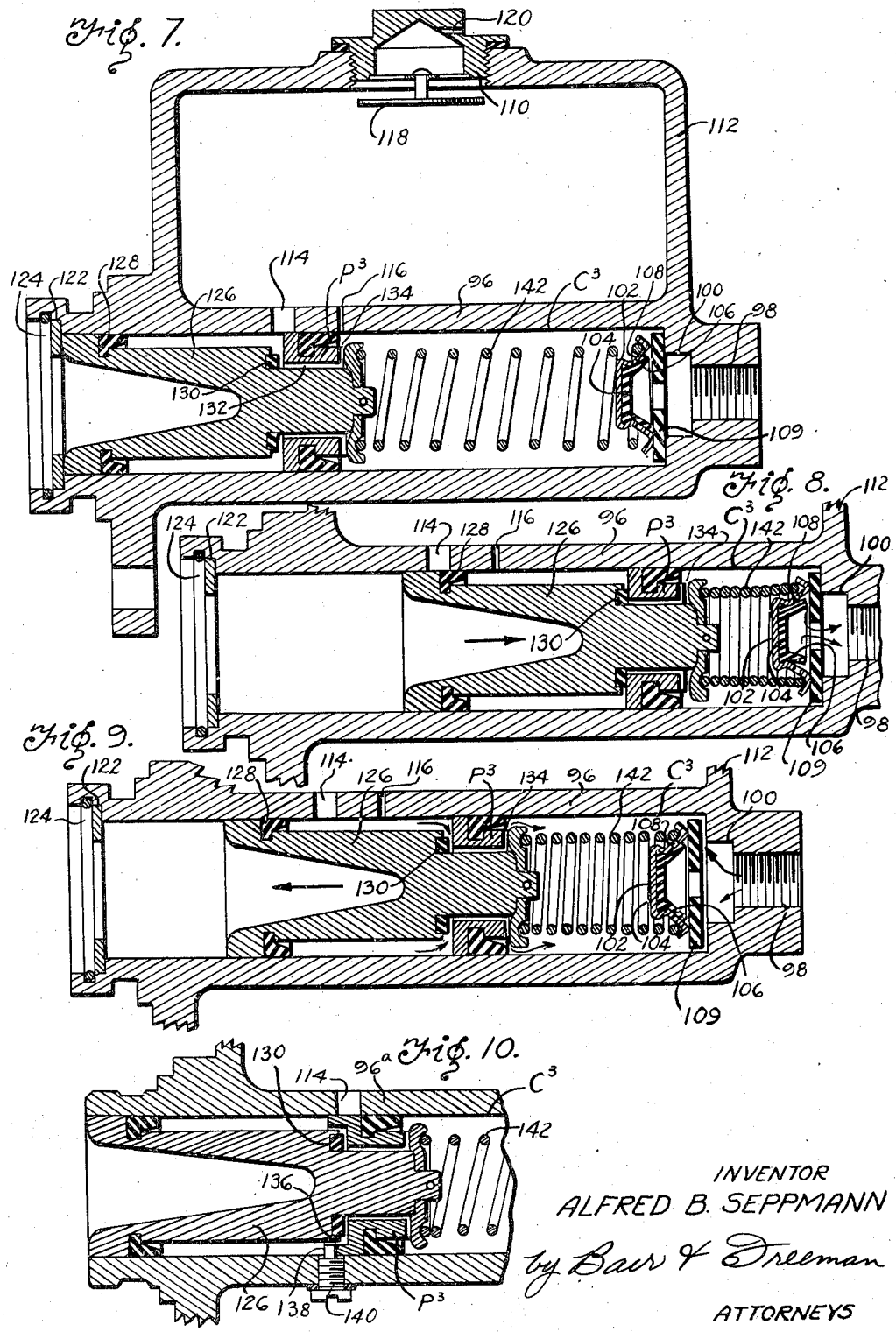

Patented Mar. 1, 1949

2,463,062

UNITED STATES PATENT OFFICE 2,463,062

COMPOUND MASTER CYLINDER FOR HYDRAULIC BRAKE SYSTEMS

Alfred B. Seppmann, Mankato, Minn.

Application February 20, 1947, Serial No. 729,825

10 Claims. (Cl. 60—54.6)

This invention relates to fluid pressure systems such as the hydraulic brake system for an automotive vehicle, the invention having particular reference to the construction of the variour cylinder, piston and valve mechanisms of a master cylinder for the system.

One object of the invention is to provide an improved type of compound cylinder structure having a number of advantages over master cylinders heretofore known.

Another object is to provide a two-phase operating arrangement for a master cylinder which permits an initial displacement of operating fluid at low pressure and high velocity, and a transition to high pressure and low velocity upon a predetermined back pressure being encountered in the brake system whereby the slack in the brake mechanisms of the systems may be quickly taken up with a small initial brake pedal movement, and thereafter the brakes may be applied with proportionally greater pressure or effective leverage between the brake pedal and the brakes.

Compound cylinders of the general two-phase operating type usually comprise a pair of cylinders, one of which has a larger diameter bore than the other with a cooperating piston mounted in each cylinder. When the pistons move through their initial range the hydraulic lines of the system are immediately filled and a pressure is but up and exerted on the brake fluid which causes movement of the brake shoes against the brake drums for initiating brake action. When a predetermined pressure is built up in the fluid system the larger cylinder is cut out of operation and its fluid pressure relieved whereupon the smaller diameter piston is utilized for applying high pressure at a slower speed.

A further object of this invention is the provision of a new arrangement of cylinders and pistons in a compound master cylinder whereby the cylinder for the high pressure piston carries the low pressure piston and telescopes over the high pressure piston which is mounted on a stationary sleeve, thus simplifying construction and the assembly of parts during the manufacturing process as well as facilitating the ready removal of various parts when repairs and/or replacements are necessary.

Still a further object is to provide an improvement in the present application over and above the disclosures in my co-pending applications, Serial No. 578,163 filed Feb. 16, 1945, and Serial No. 691,251 filed August 17, 1946, particularly in respect to certain porting arrangements in the high and low pressure pistons that permit charging of the low pressure cylinder with operating fluid from the reservoir of the master cylinder and flow of the fluid from the low pressure cylinder past the high pressure piston into the high pressure cylinder during the initial build-up of pressure in the master cylinder.

An additional object is to provide the porting arrangement automatically operable depending upon the direction of travel of the parts and upon the relative fluid pressures in various chambers of the master cylinder so that the porting is open during a desired period and serves to eliminate those types of cylinder ports which are closed off by cup leathers of the pistons as in my co-pending applications and which result in the cup leathers being forced at times into the ports due to the fluid under pressure. Such forcing of the cup leathers shortens their life.

Another additional object is to provide the porting arrangement in the form of grooves in the bores and end faces of sleeve-like pistons, flat seating washers being provided for seal-off which is effected by relative movement between the grooved end faces of the pistons and the washer in a direction longitudinally of the sliding axes for the pistons.

Still another additional object is to provide a porting arrangement that permits flow of fluid from the low pressure cylinder into the high pressure cylinder during a time when it is desirable to draw additional operating fluid into the high pressure cylinder, as when the brake pedal has been depressed as far as it will go and more braking effect is needed, it being then merely necessary for the operator to quickly let up on the brake pedal to permit the entry of additional brake fluid so that the brakes can be applied with additional pressure when the pedal is again depressed, the pedal then being operable to supply such required additional pressure without being depressed its full extent.

A further additional object is to provide a by-pass port arrangement that permits a proper balance of fluid in the master cylinder by positively opening the ports from the reservoir to both the low and high pressure cylinders so that between braking actions the brake fluid is supplied to make up for any that was forced back into the reservoir due to brake operation.

Still a further additional object is to provide a modified form of piston that can be used in a standard master cylinder and will be operable to permit pumping additional brake fluid into the cylinder when additional braking power is required.

Still a further additional object is to provide the modified form of piston operable in a modified form of standard master cylinder to eliminate fluid bypass by the usual porting arrangement that permits entry of brake fluid across the edge of the piston cup leather so that the life of the cup leather can be thereby considerably extended.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 3 is a similar sectional view showing the position of the parts after passing the low pressure phase and during the high pressure phase when the brakes are being applied.

Figure 4 is a similar sectional view showing the pressure on the brake pedal being relieved for pumping in additional oil to secure additional power for applying the brakes.

Figure 5 is an enlarged sectional view on the line 5—5 of Figure 4.

Figure 6 is an enlarged sectional view on the line 6—6 of Figure 4.

Figure 7 is a vertical sectional view through a modified piston utilizing my invention and showing it applied to a non-compounded type of master cylinder.

Figures 8 and 9 are similar sectional views showing respectively brake operation and brake pedal release for pumping in additional brake fluid, and Figure 10 is a sectional view similar to Figure 7 showing a further modified construction.

Figure 1:
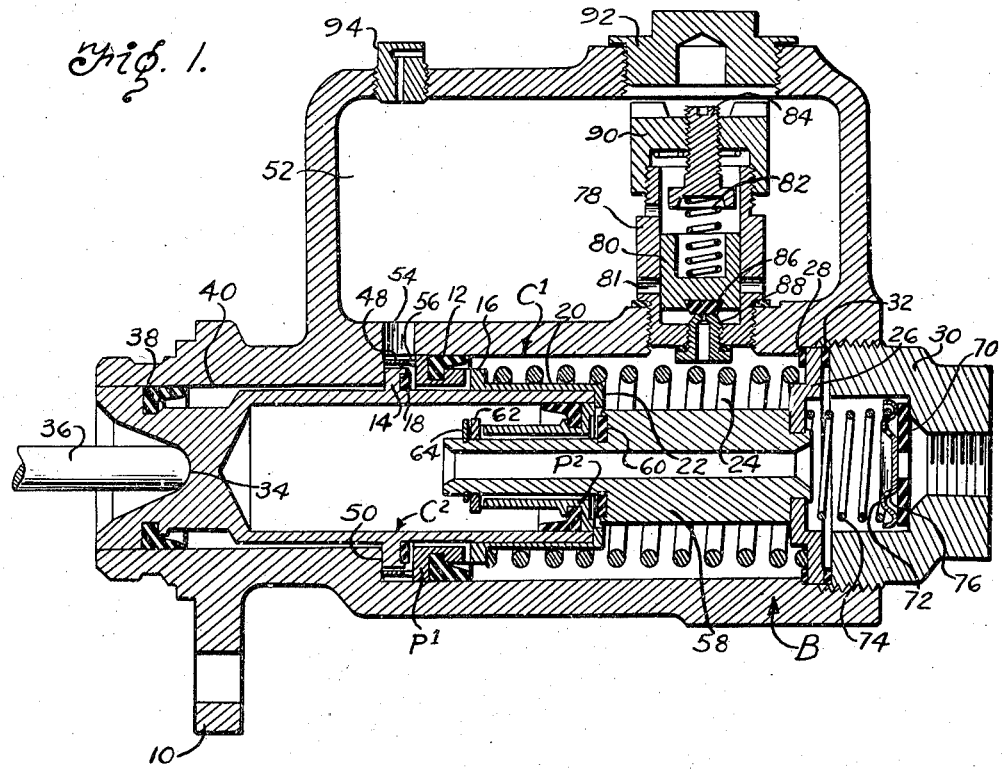
Figure 1 is a vertical sectional view through a master cylinder embodying my invention and showing the parts in the normal position. The brake fluid has been omitted from all figures of the drawings.

On the accompanying drawings I have used the reference character B to indicate a master cylinder body which may be mounted in the usual manner as by means of perforated lugs 10 as shown in my co-pending applications. The body B has a low pressure bore which I will refer to as a low pressure cylinder and this bore is given the reference character $C^1$.

Slidable in the cylinder $C^1$ is a piston $P^1$ in the form of a sleeve of special construction and carrying a cup leather 12 for sealing purposes. The piston $P^1$ may be termed a "floating piston" as it is slidably mounted on a sleeve that constitutes a high pressure cylinder $C^2$. The cylinder $C^2$ has shoulders 14 and 16 between which the low pressure piston $P^1$ floats, the shoulder 14 being provided with a sealing washer 18 to seal at times against the left end of the sleeve-like piston $P^1$.

The shoulder 16 is formed on a sleeve 20 surrounding the cylinder $C^2$ and having an inturned flange 22 held against the inner end of the cylinder by a return spring 24. The flange 22 is wider than the end of the cylinder $C^2$ for a purpose which will hereinafter appear. The return spring 24 seats against a stationary disc 26 held in position against a shoulder 28 by a fitting 30. Suitable gaskets 32 seal against leakage at this point.

The cylinder $C^2$ terminates at its outer end in a seat 34 with which the operating rod 36 from a brake pedal coacts. This outer end is provided with a cup leather 38 for sealing purposes with respect to a bore 40 which constitutes a reduced extension of the cylinder $C^1$.

The piston sleeve $P^1$ has a bore indicated at 42 in Figure 5 and at six points around this bore axially extending grooves 44 are provided. These communicate with radially extending grooves 46 in the inner end face of the sleeve. The outer end face of the sleeve, as already mentioned, is adapted to seat against the sealing washer 18, and the piston $P^1$ has a sleeve-like extension 48 surrounding this washer and the flange 14.

The sleeve 48 is slightly greater in length than the thickness of the elements 14 and 18 so that when it and the element 14 engage a shoulder 50 in the bore B that serves as the transition from the bore $C^1$ to the bore 40, the sealing washer 18 will be spaced from the left end of the piston $P^1$ as shown in Figure 1 so that brake fluid contained in a reservoir 52 formed in the body B above the cylinder $C^1$ may flow through a passageway 54 and through several openings 56 in the sleeve 48 and into the low and high pressure cylinders $C^1$ and $C^2$. The path of flow is past the sealing washer 18, through the grooves 44 and 46 into the cylinder $C^1$ and then into the high pressure cylinder as will be hereinafter described.

The high pressure piston $P^2$ is likewise in the form of a sleeve floating on a stationary sleeve 58. The sleeve 58 is carried by the disc 26 and is provided with a sealing washer 60 for the right hand end of the piston $P^2$. At the left hand end a washer 62 serves as a stop shoulder and is retained in position by a retainer washer 64 located in an annular groove around the sleeve 58.

The piston $P^2$ is provided with axially extending grooves 66 as shown in Figure 5 and radially extending grooves 68 in its outer end face past the washer 62 so that brake fluid can flow when the parts are in the position of Figure 1. The fluid may flow past the sealing washer 60 and then through the grooves 66 and 68 into the high pressure cylinder $C^2$. Thus the cylinder is properly filled with brake fluid when the brake system is idle, the fluid being supplied by gravity from the reservoir 52.

Between the disc 26 and a shoulder in the fitting 30 is a sealing washer 70, a valve disc 72 and a valve spring 74. The disc 72 is provided with openings 76.

Between the reservoir 52 and the cylinder $C^1$ is a relief valve, the body of which is indicated at 78. A valve plug 80 is slidable therein under the action of a spring 82 the tension of which may be adjusted by means of a screw 84. The valve plug 80 carries an insert of rubber or the like 86 to seat against a relief valve seat member 88.

The adjusting screw 84 is threaded in a cap 90. The cap 90 is closed by a plug 92 in the upper wall of the reservoir 52. The reservoir is also provided with a breather plug 94 so located that the hole 54 can be drilled during manufacture before the plug is inserted.

In Figure 7 I show a modified form of my invention with a special piston $P^3$ in a standard master cylinder of the non-compounded type. Describing first the parts of the standard master cylinder, the cylinder has a body 96 in which the cylinder bore $C^3$ is located. One end is threaded at 98, this being the connection to the hydraulic system.

A sealing washer 100 and a valve disc 102 are provided, the valve disc having a rubber insert 104 provided with a portion 106 normally sealing against openings 108 in the valve disc 102. A closure plug 110 is provided for the reservoir 112 and the reservoir has passages 114 and 116 into the cylinder $C^3$. A baffle plate 118 is supported by the plug 114 and the plug is vented at 120. A retainer washer 122 is provided in the left end of the cylinder and held in position by a snap-in retainer wire 124.

In place of the usual piston I provide the floating piston $P^3$ mounted on an extension of the actuating plunger 126 that takes the place of the standard plunger. The plunger 126 has a sealing cup leather at 128 and a sealing washer at 130. The sleeve-like piston $P^3$ has axial grooves 132 and radial grooves 134 corresponding to the grooves 44 and 46 or 66 and 68.

In Figure 10 I show a modified construction for the cylinder $C^3$ which consists of a different casting forming the body 96a of the standard master cylinder. The elements 122 and 124 and the necessary portion of the cylinder body 96a to support them is omitted while the passage 114 is retained. In other respects the plunger 126 and the piston $P^3$ are substantially the same except that the piston has a sleeve-like stop extension 136. This is adapted to engage against a projection 138 on a stop screw 140 and if desired two or more of these stop screws may be located around the body 96a.

Interposed between the plunger 26 and the valve disc 102 in both Figures 7 and 10 is a return spring 142 which is standard in the conventional master cylinder of non-compounded type.

PRACTICAL OPERATION

With Respect to Figures 1 to 6

In the operation of my master cylinder, the parts are normally in the position of Figure 1 under the action of the return spring 24. The spring propels the cylinder $C^2$ and the piston $P^1$ rearwardly as from the position of Figure 3 when the operator removes his foot from the brake pedal that operates the rod 36. At the time of release the piston $P^1$ will be held by friction until the flange 16 of the sleeve 20 is engaged with the inner end of the piston which results in spacing the piston from the sealing washer 18 as in Figure 4 so that as the return spring 24 propels the cylinder $C^2$ toward the left, brake fluid can enter the cylinder $C^1$ ahead of the piston $P^1$ by flowing from the portion of the cylinder $C^1$ back of the piston through the openings 56, past the washer 18 and through the grooves 44 and 46.

Brake fluid at this time is being supplied to the high pressure cylinder $C^2$ from the brake system. This causes the piston $P^2$ to remain seated on the sealing washer 60, as in Figure 3 until the brake pistons have returned to their initial positions. Any further movement of the cylinder $C^2$ under the action of the spring 24 must draw additional brake fluid into the cylinder $C^2$. This automatically occurs because upon the release of pressure in the cylinder $C^2$ caused by the brake pistons reaching their initial positions, the piston $P^2$ will move away from the washer 60 so that upon further movement of the cylinder $C^2$ brake fluid will flow from in front of the piston $P^1$ across the face of the washer 60, through the grooves 66 and 68, and past the washer 62 into the cylinder $C^2$. The cylinder will thereupon continue to the final position of Figure 1 wherein the piston $P^1$ is positively held spaced from the washer 18 by the flange 48 engaging the shoulder 50. In this position all passageways 44, 46, 66 and 68 are open so that there may be free flow of fluid from the reservoir for keeping the brake system filled with fluid. Also any changes in temperature that cause expansion or contraction are taken care of by the passageways being open for free flow of fluid.

Figure 2:
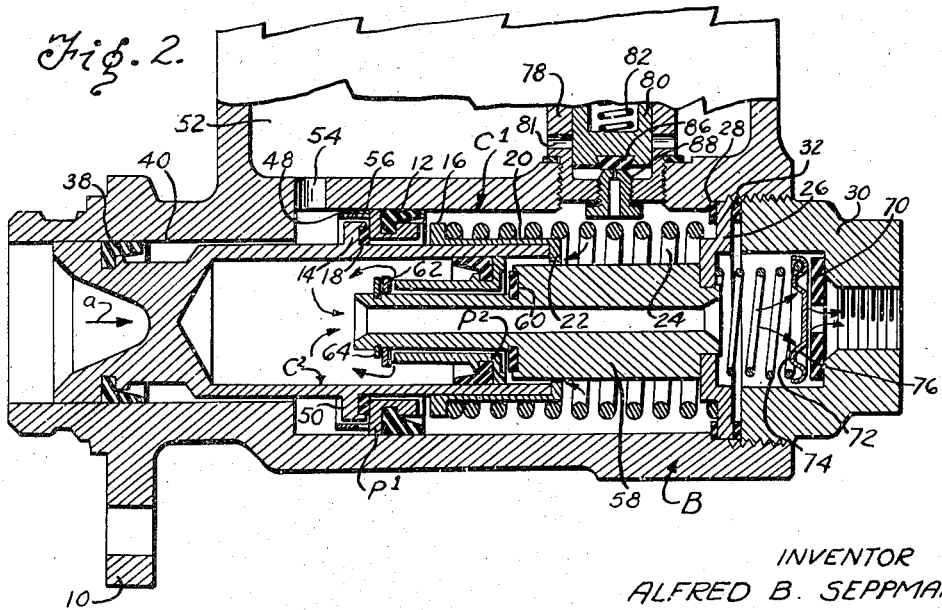
Figure 2 is a similar sectional view showing the initial application of the brakes with the brake fluid at low pressure.

When applying the brakes, the first depression of the brake pedal will move the cylinder $C^2$ in the direction of the arrow $a$ in Figure 2 which causes a low pressure operation because the brakes have not yet "taken hold" but the slack is merely being taken up throughout the brake system. This take-up of slack is caused by the piston $P^1$ displacing fluid from the cylinder $C^1$ in front of the piston because at this time the piston is against the sealing washer 18 as in Figure 2. The displaced fluid flows through the piston $P^2$, that is, past the washer 60, through the grooves 66 and 68, past the washer 62 and into the cylinder $C^2$ from which it flows into the sleeve 58 and into the hydraulic brakes connected with the fitting 38. Both pistons $P^1$ and $P^2$ are operative in this movement as some fluid is displaced by the piston $P^1$ and additional fluid is displaced by the piston $P^2$, the two quantities of fluid added together flowing at relatively high velocity and low pressure through the fitting 38 and into the brake system. As shown in Figure 2 during this operation the fluid flows through the openings 76 of the valve disc 72 raising it from the washer 70 and flowing through the hole in the center of the washer.

When the slack is taken up, further movement of the brake pedal will cause a build-up of pressure in the brake system and when that pressure exceeds a certain value as set by the adjusting screw 94, the pressure relief valve will open slightly (the disc 86 leaving the seat fitting 88), whereupon the fluid under pressure will act on the enlarged lower surface of the valve plug 80 to move it upwardly until it opens bypass ports 81 and permits the fluid to return to the reservoir 52. This relieves the pressure in the cylinder $C^1$ so that the piston $P^2$ under the superior pressure in the cylinder $C^2$ will move to seating position on the washer 60 as shown in Figure 3.

Further movement of the cylinder $C^2$ resulting from further depression of the brake pedal will effect high pressure operation only due to the low pressure piston $P^1$ being no longer effective and the high pressure piston $P^2$ only being effective for the purpose of displacing fluid from within the high pressure cylinder $C^2$ past the valve disc 72 and into the brake system.

After the braking operation, when the brake pedal is released, the returning fluid from the brake cylinders will aid the spring 24 in returning the cylinder $C^2$ to the initial position of Figure 1. In the returned position the sleeve 20 acts as a spacer to space the piston $P^1$ from the sealing washer 18 and in the final position to engage the piston $P^2$ and move it to a position spaced from the sealing washer 60 so that there can be a free flow of brake fluid from within the cylinder $C^2$ to within the cylinder $C^1$ and through the piston $P^1$ to the reservoir 52. The flange 22 extending farther inward than the internal diameter of the cylinder C² serves thus to engage the piston P² to hold it spaced from its seat (the sealing washer 60).

If the driver of the vehicle finds that depression of the brake pedal as far as it will go does not result in the desired braking action he can pump additional fluid into the high pressure cylinder C² by letting up quickly on the brake pedal so that the return spring 24 propels cylinder C² toward the left as in Figure 4, carrying with it the piston P² so that this piston becomes spaced from the sealing washer 60. The desired additional fluid is then taken into the high pressure cylinder C² from the low pressure cylinder C¹ past the sealing washer 60 and through the grooves 66 and 68 past the washer 62. Some of the brake fluid may pass back past the valve disc 72 but there will be a predominance of fluid let into the high pressure cylinder from the low pressure cylinder and also from the reservoir through the grooves 44 and 46 so that a greater charge of fluid is then contained in the high pressure cylinder. Accordingly the next stroke of the brake pedal need not be as far in order to get the same braking effect at the brake cylinders.

With respect to Figures 7, 8 and 9

In the form of invention shown in Figures 7, 8 and 9 the piston P³ is normally in the position of Figure 7 under the action of the return spring 142. It will be noted that the piston P³ is spaced from the sealing washer 130 so that fluid may freely flow from the reservoir 112 through the opening 114 past the sealing washer, and through the piston grooves 132 and 134. This recharges the master cylinder 96 with operating or brake fluid.

When the pedal is depressed the sleeve moves in the direction of the arrow in Figure 8, first effecting a seal between the piston P³ and the washer 130 and thereafter displacing fluid from the cylinder C³ through the openings 108 of the valve disc 102. This fluid bends the periphery of the resilient cup 104 as in this figure for permitting oil flow through the opening of the washer 109.

If the brake pedal is completely depressed and enough braking action has not been had, a quick let-up on the pressure will space the piston P³ from the sealing washer 130 as in Figure 9 so that additional oil can be taken into the cylinder C³ to extend the brake applying movement upon the next depression of the brake pedal. From the description just completed it is obvious that my floating piston arrangement is also readily adaptable for non-compounded master cylinders of the type shown in Figure 7.

Figure 10 shows a modification wherein the piston P³ is positively held spaced from the washer 130 when the sleeve 126 is returned to its initial position. This is an improvement over the arrangement shown in Figure 7, where friction is depended upon to keep the piston in this position in relation to the sleeve 126. The construction of Figure 10 requires modification of the master cylinder itself and eliminates the necessity of the stop washer 112 of Figure 7 found in the standard type of master cylinder.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a master cylinder of the character disclosed, a low pressure cylinder, a low pressure piston slidable therein, a high pressure cylinder on which said low pressure piston has limited sliding movement, a sleeve projecting into said high pressure cylinder and communicating with a brake system or the like adapted to receive actuating fluid from said master cylinder, a high pressure piston slidable on said sleeve with limited movement, means for sealing said low pressure piston relative to said high pressure cylinder when the cylinder is moved forwardly and for breaking the seal and permitting bypass of actuating fluid through said low pressure piston when the high pressure cylinder moves in a rearward direction, means for sealing said high pressure piston with respect to said sleeve as said high pressure cylinder moves forward and permitting bypass of fluid between said low and high pressure cylinders on the reverse movement of said high pressure cylinder, spring means to effect such reverse movement, a reservoir for supplying fluid to said low pressure cylinder behind said low pressure piston, and relief means for permitting return flow of fluid from said low pressure cylinder ahead of said low pressure piston, to said reservoir when the pressure in said low pressure cylinder exceeds a predetermined value.

2. In a master cylinder, a low pressure cylinder, a low pressure piston slidable therein, a high pressure cylinder on which said low pressure piston has limited sliding movement, a sleeve projecting into said high pressure cylinder and communicating with a brake system or the like adapted to receive actuating fluid from said master cylinder, a high pressure piston slidable on said sleeve with limited movement in relation thereto, means for sealing said low pressure piston relative to said high pressure cylinder when the cylinder is moved in one direction and for breaking the seal and permitting bypass of actuating fluid through said low pressure piston when the high pressure cylinder moves in the other direction, and means for sealing said high pressure piston with respect to said sleeve as said high pressure cylinder moves in one direction and permitting bypass of fluid through said high pressure piston between said low and high pressure cylinders upon movement of said high pressure cylinder in an opposite direction.

3. In a hydraulic power master cylinder of the character disclosed, a low pressure cylinder, a low pressure piston slidable therein, a high pressure cylinder on which said low pressure piston has limited sliding movement, a sleeve projecting into said high pressure cylinder and communicating with a fluid pressure utilizing system, a high pressure piston slidable in said high pressure cylinder and on said sleeve with limited movement, means for sealing said pistons relative to their cylinders upon movement in one direction, and means permitting bypass of actuating fluid through said pistons upon movement in an opposite direction.

4. In a master cylinder, a low pressure cylinder, a low pressure piston therein, means for moving said low pressure piston, said low pressure piston being connected therewith for limited lost motion in relation thereto, means to effect a seal between said first means and said low pressure piston when said first means moves in one direction and to break the seal and permit flow of fluid through the piston when said first means moves in the opposite direction, a reservoir having communication with said low pressure cylinder back of said low pressure piston and communication with said low pressure cylinder ahead of said piston, the last means of communication including a relief valve openable upon a predetermined pressure in said low pressure cylinder ahead of said piston, said first means constituting a high pressure cylinder in series with said low pressure cylinder, a high pressure piston therein, means for sealing said high pressure piston in relation to the outlet from said high pressure cylinder upon movement of said first means in one direction and for permitting bypass of fluid between said low and high pressure cylinders upon movement in the opposite direction, and spring means to effect such movement in the opposite direction.

5. In a hydraulic power unit, a low pressure cylinder, a low pressure piston therein, means for moving said low pressure piston, said low pressure piston being connected therewith for limited lost motion in relation thereto, means to effect a seal between said first means and said low pressure piston when said first means moves in one direction and to break the seal and permit flow of fluid through the piston when said first means moves in the opposite direction, a reservoir having communication with said low pressure cylinder back of said low pressure piston and communication therewith ahead of said piston, the last means of communication including a relief valve openable upon a predetermined pressure in said low pressure cylinder ahead of said piston, said first means constituting a high pressure cylinder in series with said low pressure cylinder, a high pressure piston therein, and means for sealing said high pressure piston in relation to the outlet from said high pressure cylinder upon movement of said first means in one direction and for permitting bypass of fluid between said low and high pressure cylinders upon movement in the opposite direction.

6. A power unit comprising a low pressure cylinder, a low pressure piston therein, a high pressure cylinder for moving said low pressure piston when the high pressure cylinder is actuated, said low pressure piston being connected therewith for limited lost motion in relation thereto, means to effect a seal between said high pressure cylinder and said low pressure piston when said high pressure cylinder moves in one direction and to break the seal and to permit flow of fluid through the piston when said high pressure cylinder moves in the opposite direction, a reservoir having communication with said low pressure cylinder both back of and in front of said piston, the last means of communication including a normally closed valve openable upon a predetermined pressure being built up in said low pressure cylinder ahead of said piston, said high pressure cylinder being in series with said low pressure cylinder, a high pressure piston therein, means for sealing said high pressure piston in relation to the outlet from said high pressure cylinder upon movement in one direction and for permitting bypass of fluid between said low and high pressure cylinders through said high pressure piston upon return movement, and spring means to automatically effect such return movement when actuation of said high pressure cylinder ceases.

7. In a master cylinder, a body member having therein a cylinder bore, a piston slidable therein, a low pressure high pressure cylinder slidable in said low pressure piston, said low pressure piston having limited movement in relation thereto, means for effecting a seal between the two when the piston is at one limit of its movement and for permitting flow of fluid from said cylinder bore on one side of said piston to the cylinder bore on the other side of the piston when the piston is at the other limit of its movement, a sleeve connected with said body member and projecting into said high pressure cylinder, said sleeve hydraulically connecting with a brake system or the like and communicating the interior of said high pressure cylinder with such brake system, a high pressure piston mounted for limited sliding motion on said sleeve, said sleeve and high pressure piston having coacting sealing means when said high pressure piston is at one limit of its movement and permitting fluid flow between said low and high pressure cylinders when it is at the other limit of its movement, a reservoir communicating with said cylinder bore both behind and in front of said low pressure piston, the last communication including a pressure relief valve from the cylinder bore to the reservoir.

8. In a power unit, a body member having therein a cylinder bore, a low pressure piston slidable therein, a high pressure cylinder slidable in said low pressure piston, said low pressure piston having limited movement in relation thereto, means for effecting a seal between the two when the piston is at one limit of its movement and for permitting flow of fluid from said cylinder bore on one side of said piston to the cylinder bore on the other side of said piston when the piston is at the other limit of its movement, a sleeve connected with said body member and projecting into said high pressure cylinder, said sleeve connecting with a fluid pressure utilizing system, said sleeve communicating the interior of said high pressure cylinder with said system, a high pressure piston mounted for limited sliding motion on said sleeve, said sleeve and high pressure piston having coacting sealing means when said piston is at one limit of its movement and permitting fluid flow between said low and high pressure cylinders when at its other limit of movement.

9. In a hydraulic power unit, a body member having therein a cylinder bore, a low pressure piston slidable in said bore, a high pressure cylinder slidable in said low pressure piston, said low pressure piston having limited movement in relation thereto, means for effecting a seal between the two when the piston is at one limit of its movement and for permitting flow of fluid from said cylinder bore on one side of said piston to the cylinder bore on the other side of said piston when the piston is at the other limit of movement, a fluid pressure delivery sleeve connected with said body member and projecting into said high pressure cylinder and a high pressure piston mounted for limited motion on said sleeve, said sleeve and high pressure piston having coacting sealing means when said piston is at one limit of its movement and permitting fluid flow between said low and high pressure cylinders when at the other limit of its movement.

10. In a power unit, a body member having therein a stepped cylinder bore, a high pressure cylinder sleeve in the small portion thereof, a low pressure piston slidable on said high pressure cylinder sleeve and spanning the distance between it and the large part of said bore, said low pressure piston having limited movement in relation to said high pressure cylinder sleeve, means for effecting a seal between the two when the low pressure piston is at its rearward limit of movement and for permitting flow of fluid between said high pressure cylinder sleeve and said low pressure piston when the piston is at its rearward limit of movement, an outlet sleeve connected with said body member and projecting into said high pressure cylinder sleeve, said outlet sleeve connecting with a fluid pressure utilizing system and communicating the interior of said high pressure cylinder sleeve with said system, a high pressure piston mounted for limited sliding motion on said outlet sleeve, said outlet sleeve and said high pressure piston having coacting sealing means when said piston is at its forward limit of movement and permitting fluid flow between said high pressure piston and said outlet sleeve when at its rearward limit of movement.

ALFRED B. SEPPMANN.

REFERENCES CITED

The following references are of record in the file of this patent:

UNITED STATES PATENTS

| Number | Name | Date |
|---|---|---|
| 2,136,835 | Begg | Nov. 15, 1938 |
| 2,152,499 | Rasmussen | Mar. 28, 1939 |
| 2,277,292 | Bowen | Mar. 24, 1942 |
| Re. 16,761 | Loughead | May 27, 1924 |

FOREIGN PATENTS

| Number | Country | Date |
|---|---|---|
| 812,483 | France | Feb. 1, 1937 |